United States Patent [19]

Furomoto

[11] Patent Number: 4,742,974
[45] Date of Patent: May 10, 1988

[54] DRAG MECHANISM FOR A FISHING REEL

[75] Inventor: Yoshiyuki Furomoto, Sakai, Japan

[73] Assignee: Shimano Industrial Company Limited, Osaka, Japan

[21] Appl. No.: 55,890

[22] Filed: Jun. 1, 1987

[30] Foreign Application Priority Data

Jun. 17, 1986 [JP] Japan ............................ 61-93162[U]

[51] Int. Cl.$^4$ ...................... A01K 89/015; F16J 15/32
[52] U.S. Cl. .................................. 242/217; 242/221; 277/28; 277/30; 277/152
[58] Field of Search ............... 242/84.1 R, 84.4, 84.41, 242/84.42, 84.43, 211, 217, 218, 219, 220, 221, 84.5 R, 84.5 A, 84.51 A; 277/28, 30, 152

[56] References Cited

U.S. PATENT DOCUMENTS

| | | | |
|---|---|---|---|
| 2,255,703 | 9/1941 | Grieten | 242/219 |
| 3,425,644 | 2/1969 | Griste | 242/221 X |
| 3,471,156 | 10/1969 | Burns et al. | 277/28 X |
| 4,131,245 | 12/1978 | Noda | 242/217 |
| 4,546,937 | 10/1985 | Hideo | 242/219 |
| 4,637,295 | 1/1987 | Powers | 277/152 X |
| 4,651,949 | 3/1987 | Sato | 242/217 |
| 4,681,276 | 7/1987 | Sato | 242/84.1 R |

FOREIGN PATENT DOCUMENTS 665121 6/1963 Canada ............................ 277/28

Primary Examiner—Stuart S. Levy
Assistant Examiner—Joseph J. Hail, III
Attorney, Agent, or Firm—Stevens, Davis, Miller & Mosher

[57] ABSTRACT

A fishing reel which includes a spool shaft, a spool supported rotatably on the spool shaft, and a drag mechanism. The drag mechanism includes a drag disc disposed opposite to one axial end face of the spool, a drag washer interposed between the axial end face of the spool and the drag disc, a cover fixed to the spool for covering an outside surface of the drag disc and the drag washer and having a center through bore through which the spool passes, a sealing member disposed between an inner periphery of the through bore and the spool shaft passing therethrough, and a contact resistance changing mechanism for causing the sealing member to have a first contact resistance with the inner periphery of the through bore and the spool shaft when the drag mechanism is in a non-operating mode and to have a second contact resistance with the inner periphery of the through bore and the spool shaft when the drag mechanism is in an operating mode, with the first contact resistance being less than the second contact resistance.

6 Claims, 2 Drawing Sheets

DRAG MECHANISM FOR A FISHING REEL

FIELD OF THE INVENTION

The present invention relates to a drag mechanism for a fishing reel, and more particularly, to a drag mechanism for a fishing reel provided with a spool shaft and a spool supported rotatably thereto.

BACKGROUND OF THE INVENTION

The well known conventional drag mechanism includes a drag washer opposite to a spool rotatably supported to a spool shaft, the drag washer abutting against the spool during a drive mode to transmit a driving force thereto to thereby rotatably drive the spool, with the spool moving away from the drag washer during a free rotation mode, thereby being freely rotated.

Since such drag mechanism is provided adjacent to the spool which winds up thereon a fishing line, water attached to a fishing line during fishing, or wash water used for rinsing the reel, flows along the outer periphery of a spool flange so as to enter a chamber in a side frame of the reel, which houses therein the drag mechanism, whereby such water may become attached to the drag washer.

If the drag mechanism is used in a condition with water attached thereto, its sliding load is altered, thereby creating a problem in that a desired drag chatacteristic is not obtainable.

The present inventor has previously proposed in Japanese Utility Model Application No. Sho 59-165,943 a fishing reel which is provided with a cover covering the axial outside portion of the drag washer and having at the center a through bore through which the spool shaft passes, thereby preventing the drag washer from becoming affected by water entering into the chamber in the side frame through the outer periphery of the flange at the spool during the fishing.

Such fishing reel, however, has an annular gap between the inner periphery of the through bore at the cover and the outer periphery of the spool shaft, whereby water entering into the chamber in the side frame may enter through the gap into the cover to attach to the drag washer.

The gap, when closed by a sealing member, can reliably prevent water from entering into the cover. In this case, a lip of the sealing member must always make contact with the inner periphery of the cover or the outer periphery of the spool shaft, whereby even when the drag mechanism is not operated, in other words, when the spool freely rotates, the sealing member contacts the inner periphery of the through bore or the outer periphery of the spool shaft so as to increase a contact resistance applied by the sealing member. As a result, there is a problem in the rotation efficiency when the spool is freely rotated by putting the drag mechanism in a non-operating mode.

SUMMARY OF THE INVENTION

An object of the invention is to provide a drag mechanism which seals by use of a sealing member a gap between the inner periphery of the cover and the outer periphery of the spool shaft side, so that, when the drag mechanism is in its non-operating mode to allow the spool to freely rotate, the rotation efficiency of the spool is improved.

The present invention is characterized in that the drag mechanism having a drag washer and a drag disc opposite to one axial end face of the spool supported rotatably to the spool shaft is provided with a cover which is fixed to the spool. The cover covers the outside of the drag disc and drag washer, and has at the center a through bore through which the spool shaft perforates. A sealing member is provided to close a gap between the inner periphery of the through bore at the cover and the outer periphery at the spool shaft side. A resistance changing means is provided which, when the drag mechanism is in a non-operating mode, reduces a contact resistance of the sealing member, and when the drag mechanism is in an operating mode, increases the contact resistance.

In addition, in the specification of the present invention, the language "the outer periphery at the spool shaft side" refers to the outer periphery of a member which is positioned at the center of the inner periphery of the cover through bore and rotatable relative to the cover, such member including of course the spool shaft and a member sleeved thereon. Also, the language "reduced contact resistance of the sealing member" means that the contact resistance is reduced when the sealing member does not contact with the aforesaid member as well as when contacting the member with a small contact resistance.

According to the present invention, when the drag mechanism is non-operating, the resistance changing means reduces the contact resistance of the sealing member to minimize a rotational resistance of the spool during the free rotation thereof, thereby improving its rotation efficiency. When the drag mechanism is in its operating mode, the contact resistance of the sealing member increases, in which the drag disc, drag washer and spool rotate integrally with each other by rotating the reel handle, so that there is no problem even when the contact resistance is larger. Also, in a case where the spool slips with respect to the drag disc so as to rotate relative thereto, the rotational resistance of the spool caused by the contact resistance is smaller in comparison with that of the spool caused by abutting against the drag disc, thereby creating no problem from the contact resistance.

Since the sealing efficiency increases as the contact resistance of the sealing member increases, structure is provided which reliably prevents water from entering into the cover housing and then the drag mechanism. As a result, especially when the drag mechanism is operated to wind up the spool, entry of water into the cover can be reliably prevented. Also, the drag mechanism, even when the fishing reel is rinsed during washing, is operated to reliably prevent water from entering into the cover.

The drag mechanism is placed in its operating or non-operating modes by axially moving the spool with shaft carrying the spool, the resistance changing means utilizing the axial movement of the spool.

The sealing member is fixed at its root portion to one of the spool shaft and a support member mounted thereon and for the drag mechanism, and is in contact with or in proximity to the other. Also, the member in contact with or in proximity to the tip end portion of the sealing member is provided with different outer diameters on which the tip end portion of the sealing member rides when the spool moves to place the drag mechanism in its operating mode. The member of different diameters provides a resistance changing means.

The above and further objects and novel features of the invention will be more fully apparent from the following detailed description when read in connection with the accompanying drawings.

DETAILED DESCRIPTION OF THE INVENTION

Figure 1:
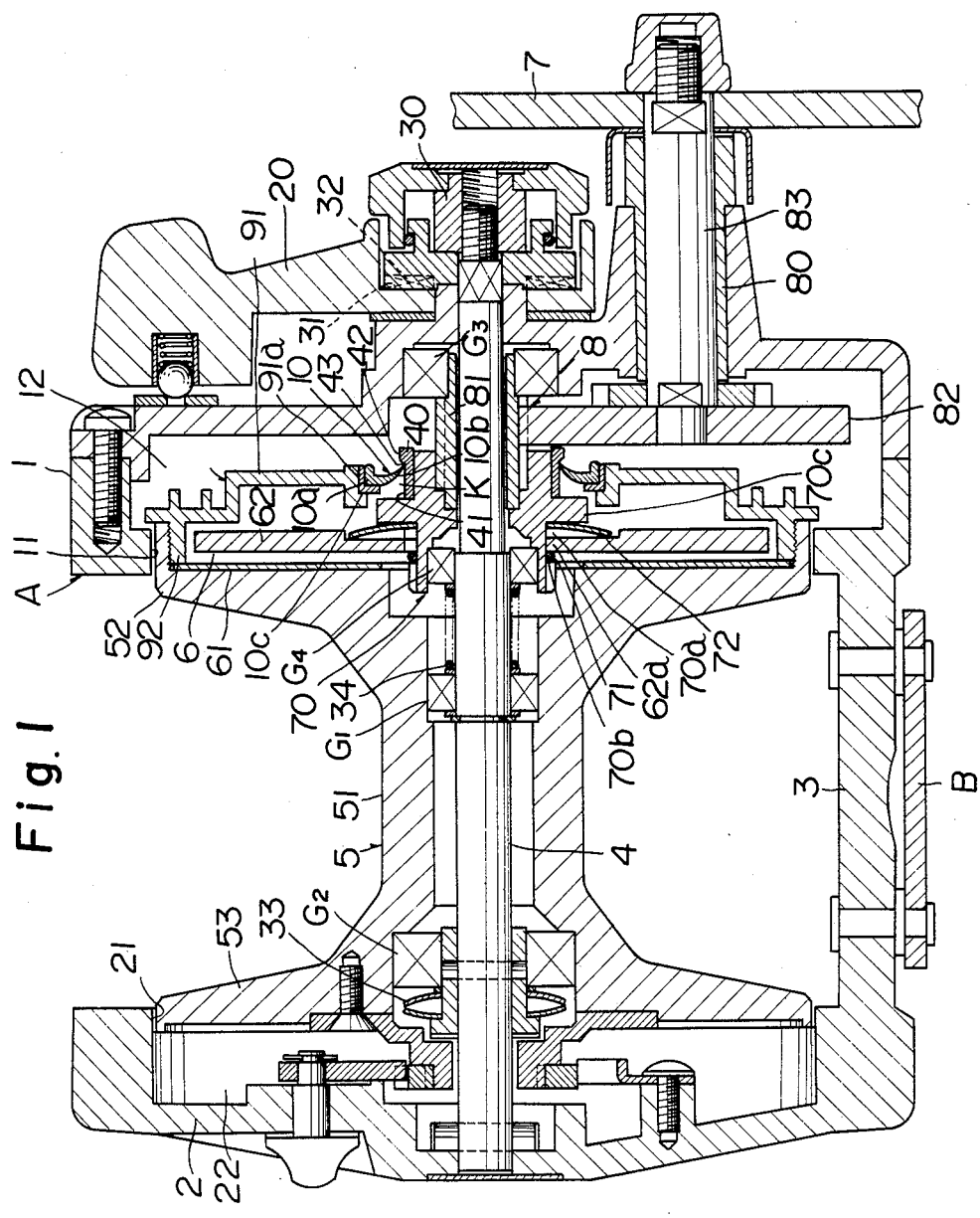
FIG. 1 is an enlarged sectional view of a fishing reel which includes one embodiment of a drag mechanism of the invention.

Referring to FIG. 1, a double-bearing fishing reel is shown, which is fundamentally constructed such that a reel body A comprises a pair of first and second side frames 1 and 2 opposite to each other and spaced at a predetermined interval and a plurality of connectors 3 for connecting the side frames 1 and 2, A spool shaft 4 is supported axially movably between the side frames 1 and 2, and a spool 5 comprising a cylindrical trunk 51 and a pair of first and second flanges 52 and 53 projecting radially outwardly from both axial ends of the trunk 51 is supported to an intermediate portion of the spool shaft 4 to be rotatable relative thereto through a pair of bearings $G_1$ and $G_2$. A mounting leg B is provided at the lower surface of the reel body A to be mounted on a fishing rod.

The side frames 1 and 2 are substantially box-shaped and open at one side, and have inner peripheries 11 and 21 opposite to the outer peripheries of the flanges of the spool 5 and form inner chambers 12 and 22 respectively. First and second flanges 52 and 53 at the spool 5 are close at their outer peripheries to the inner peripheries 11 and 21 of the side frames 1 and 2, thereby preventing water from entering into the chambers 12 and 22 through gaps between the inner peripheries 11 and 21 and the outer peripheries of the spool flanges respectively. In the chamber 12 at the first side frame 1 is provided a drag mechanism 6 having a drag washer 61 and a drag disc 62 opposite to the end surface of the spool 5 at the first flange 52 side, so that a driving force generated from rotation of the handle 7 is transmitted to the spool 5 through the drag mechanism 6.

The first side frame 1 houses therein a drive mechanism having a pinion 81 fitted onto the outer periphery of spool shaft 4 to be rotatable with respect to the spool shaft 4 and the first side frame 1 through a bearing $G_3$, and a master gear 82 engageable with the pinion 81. A driving shaft 83 is supported rotatably to the first side frame 1 through a tubular shaft 80 and supports the master gear 82 at the end entering into the first side frame 1, and the handle 7 at the end projecting outwardly, so that the driving force generated by rotation of the handle 7 is transmitted to the spool 5 through the master gear 82, pinion 81, drag disc 62 and drag washer 61, thereby driving the spool 5. The spool shaft 4 projects at one end outwardly from the first side frame 1. A drag lever 20 operable to axially shift the spool shaft 4 is supported to the outer periphery of the projecting end of the spool shaft 4 to be rotatable only relative thereto. A locking member 30 is screwably mounted on the axial end of the projecting end of the spool shaft 4, and a pair of first and second cam means 31 and 32 having cam surfaces axially displaced toward the circumference are provided between the drag lever 20 and the locking member 30. Drag lever 20 rotates to axially move the second cam 32 at the locking member 30 away from the first cam 31 at the drag lever 20 side 30, thereby shifting the spool shaft 4 to the right in FIG. 1. Also, the movement of spool shaft 4 is transmitted to the spool 5 through leaf springs 33 and a bearing $G_2$, so that the spool 5 together with the spool shaft 4 are moved toward the first side frame 1 to bring the drag washer 61 into press-contact with the drag disc 62, whereby the rotation of the spool 5 with respect to the spool shaft 4 is subjected to a predetermined resistance due to a dragging force caused by the press-contact.

The drag washer 61 is formed mainly of a basic material, such as a thin phenol resin plate or a thin metal plate, having heat resistance and flexibility, the basic material being attached at both surfaces with woven fabric, such as cotton or linen, having heat resistance.

The drag disc 62 is held to a rotary cylinder 70 supported to the spool shaft 4 such that item is non-movable axially and rotatable together with the pinion 81. Drag disc 62 is provided at its inner periphery with splines 62a, while rotary cylinder 70 is provided at the outer periphery of one axial end with splines 70a engageable with the splines 62a, and with an annular groove 70b crossing the splines 70a. The splines 62a are fitted to splines 70a to prevent the drag disc 62 from rotating relative to the rotary cylinder 70, and a snap ring 71 is fitted into the annular groove 70b to impede axially inward movement of the drag disc 62. A leaf spring 72 is interposed between the outside surface of drag disc 62 and a larger diameter portion 70c provided at an axially intermediate portion of the rotary cylinder 70 so that the leaf spring 72 prevents the drag disc 62 from moving axially outwardly.

The rotary cylinder 70 is supported at one axial end rotatably to the spool shaft 4 through a bearing $G_4$ and fitted at its other axial end onto the end portion of pinion 81 such that it is non-rotatable relative thereto.

Figure 2:
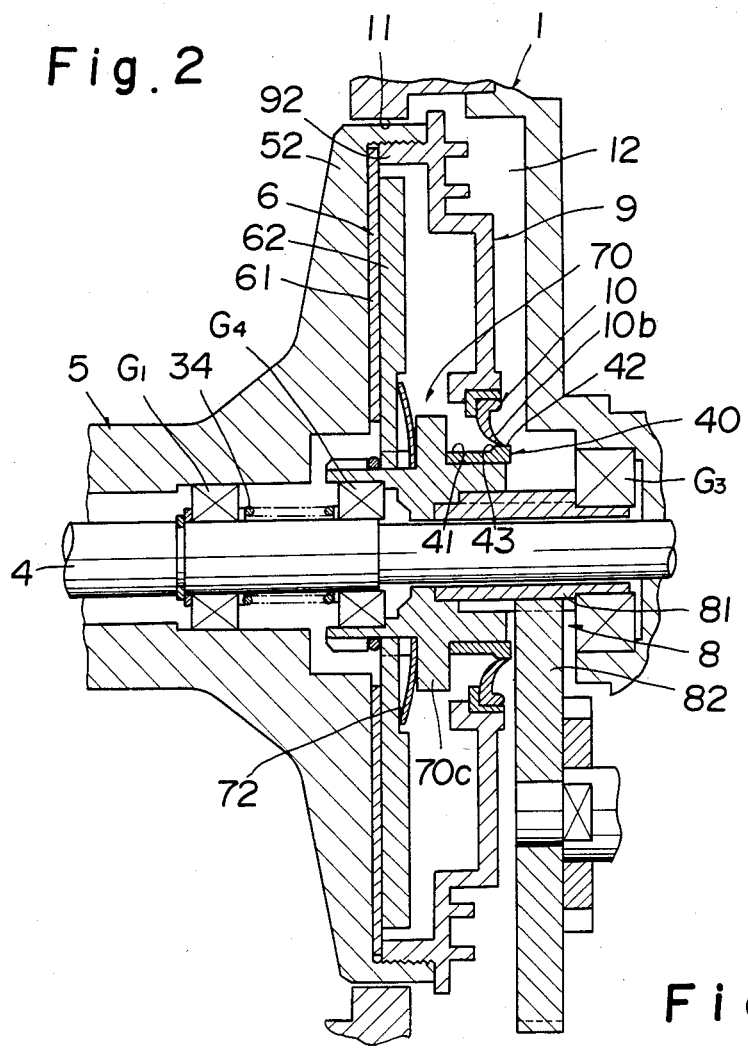
FIG. 2 is a partial sectional view illustrating the operating mode of the drag mechanism of the fishing reel shown in FIG. 1.

In the embodiment of the invention shown in FIGS. 1 and 2, a cover 9 is provided which covers the drag washer 61 and drag disc 62 and has a central through bore 91a through which the spool shaft 4 passes. A sealing member 10 is provided in a gap K between the inner periphery of the through bore 91a and the outer periphery of the rotary cylinder 70, and a contact resistance changing means is provided which reduces the contact resistance of the sealing member 10 when the drag mechanism 6 is not operable, and increases the same when the drag mechanism 6 is operable.

In the aforesaid construction, the cover 9 is formed preferably of synthetic resin and comprises the disc 91 and a mounting cylinder 92 extending axially inwardly from the outer periphery of the disc 91 and having at its outer periphery a screw thread. Mounting cylinder 92 screws with the outer periphery of the first flange 52. Through bore 91a is formed at a boss provided at the center of disc 91.

The sealing member 10 is annular and has at the outer periphery a thick base 10a and at the inner periphery a thin elastically deformable lip 10b, the base 10a being fitted to the inner periphery of the through bore 91a as shown. In addition, preferably lip 10b is oriented axially outwardly with respect to the cover 9 as shown, and base 10a engages with a flanged metal ring 10c as shown. Also, the sealing member 10 is formed preferably of rubber, but may be formed of other materials, or an O-ring may be used instead.

The contact resistance changing means of the embodiment in FIGS. 1 and 2 uses a sleeve 40 which is provided at the outer periphery with a first contact portion 41 of a smaller diameter for reducing the contact resistance of the sealing member 10 and a second contact portion 42 of a larger diameter for increasing the same, the first and second contact portions 41 and 42 being connected through a sloped shoulder 43. The sleeve 40 is fitted onto the outer periphery of the rotary cylinder 70 such that the first contact portion 41 is positioned radially inwardly and the second contact portion 42 radially outwardly. Hence, when the drag mechanism 6 is not operable as shown in FIG. 1, the lip 10b is adapted to come into contact with the first contact portion 41 at a slight contact resistance without being deformed, or to make no contact therewith. Also, when the spool 5 moves axially outwardly to operate the drag mechanism 6, the lip 10b rides on the second contact portion 42 of a larger diameter so as to be elastically deformed and come into contact with the second contact portion 42 to increase the contact resistance. In other words, the gap K between the inner periphery of the through bore 91a and the outer periphery of the sleeve 40 is reliably closed.

Preferably a viscous lubricant, such as grease, is applied onto the outer periphery of the sleeve 40 to reduce deterioration of rotation efficiency of the spool 10 caused by the sealing member 10.

In addition, in the drawing, reference numeral 34 designates a return spring interposed between the bearings $G_1$ and $G_4$ so as to restore the spool shaft 4 and spool 5 toward the second side frame 2.

In operation when a fishing reel having the drag mechanism of the invention is used to cast a fishing line during fishing, the spool 5 is moved away from the drag disc 62 as shown in FIG. 1 to place drag mechanism 6 in a non-operating mode so as to allow the spool 5 to freely rotate, and lip 10b of the sealing member 10 comes into slight contact with the first contact portion 41 of small diameter at the sleeve 40 or makes no contact at all therewith, thereby extremely improving the rotation efficiency of the spool 5. As the result, a line casting distance during free rotation of spool 5 can be increased.

When the fishing line is wound onto the spool 5, the drag lever 20 is operated to axially move the spool 5 and bring it into press-contact with the drag disc 62, whereby the drag mechanism 6 is actuated and the handle 7 is operated to forcibly rotate the spool 5.

Since the lip 10b of the sealing member 10, when the drag mechanism 6 is actuated, makes contact with the second contact portion 42 of larger diameter at the sleeve 40 as shown in FIG. 2 to thereby increase the sealing effect, even when water attached to the line enters chamber 12 through the outer periphery of the first flange 52, the sealing member 10 can reliably prevent the water from entering into the cover 9 through the gap K. Hence, the drag washer 61 and drag disc 62 in the cover 9 can be prevented from becoming wet. In addition, the lip 10b, which is oriented axially outwardly of the cover 9 as shown in FIG. 1, can improve the sealing effect when in contact with the second contact portion 42.

When the line is wound onto the spool 5 by actuating the drag mechanism 6, the rotary cylinder 70 and cover 9 rotate integrally with each other, whereby even when the contact resistance provided by the sealing member 10 increases, the rotation of the spool 5 is not heavy. When a pulling force by a hooked fish is larger than a dragging force set by the drag lever 20, the spool 5 rotates while sliding with respect to the drag disc 62, resulting in that the sealing member 10 rotates relative to the rotary cylinder 70 and sleeve 40 fixed thereto to apply resistance to the rotation of spool 5, in which the rotational resistance by the sealing member 10 is relatively smaller than a braking force by the drag disc 62, thereby creating no problem.

When the reel is drenched while putting the drag mechanism 6 into its operating mode, the gap K is effectively closed by the lip 10b rising on the second contact portion 42, thereby preventing the drag washer 61 and drag disc 62 from being wet by wash water entering into the cover 9.

Alternatively, the contact resistance changing means may be provided at the cover 9 and the sealing member 10 be supported to the rotary cylinder 70.

Also, the contact resistance changing means may alternatively use a smaller diameter portion 41 and a larger diameter portion 42 directly provided at the outer periphery of the rotary cylinder 70.

Figure 3:
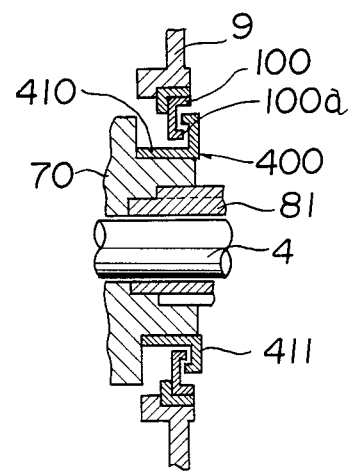
FIG. 3 is a sectional view of another embodiment of a resistance changing means according to the invention.

Alternatively, as shown in FIG. 3, a sealing member 100 is provided at the inner periphery with an annular sealing surface 100a facing axially, a sleeve 400 comprising a shaft portion 410 radially opposite to the sealing member 100 and a flange 411 projecting from one axial end of the shaft portion 410 is formed. Flange 41 is opposite at the inner surface to the sealing surface 100a. When drag mechanism 6 is operated, the sealing surface 100a comes into press-contact with the flange 411. In this embodiment, it is preferable that the inner periphery of sealing member 100 is kept not in contact with the shaft portion 410.

Also, in the aforesaid embodiment, the drag disc 62 may alternatively be moved with respect to the spool 5 to thereby actuate the drag mechanism 6.

The drag washer 61 may alternatively be supported at the side of drag disc 62.

Although several embodiments have been described, above they are merely exemplary of the invention and not to be construed as limiting, the invention being defined solely by the appended claims.

What is claimed is:

1. A fishing reel, comprising:
   a spool shaft;
   a spool supported rotatably on said spool shaft; and
   a drag mechanism comprising:
   (i) a drag disc disposed opposite to one axial end face of said spool;
   (ii) a drag washer interposed between said axial end face of said spool and said drag disc;
   (iii) a cover fixed to said spool, said cover covering an outside surface of said drag disc and said drag washer and having a center through-bore through which said spool shaft passes;
   (iv) a sealing member disposed between an inner periphery of said through-bore and said spool shaft passing therethrough; and
   (v) a contact resistance changing means for causing said sealing member to have a first contact resistance with said inner periphery of said through-bore and said spool shaft when said drag mechanism is in a non-operating mode and to have a second contact resistance with said inner periphery of said through-bore and said spool shaft when said drag mechanism is in an operating mode, said first contact resistance being less than said second contact resistance.

2. A fishing reel according to claim 1, wherein said contact resistance changing means is provided with a first contact portion and a second contact portion different in diameter from each other, said first contact portion serving to reduce said contact resistance of said sealing member, said second contact portion serving to increase said contact resistance of said sealing member.

3. A fishing reel according to claim 1, wherein said sealing member is held at its base portion to said through bore of said cover, said contact resistance changing means comprising a sleeve mounted on said spool shaft and provided with a first contact portion of a first diameter for reducing the contact resistance of said sealing member and a second contact portion of a second diameter for increasing the contact resistance of said sealing member, said second diameter being larger then said first diameter.

4. A fishing reel according to claim 3, wherein a rotary cylinder is mounted on said spool shaft for supporting said drag disc and holding said sleeve.

5. A fishing reel according to claim 1, wherein said contact resistance changing means is provided with a shaft portion disposed opposite to said sealing member radially of said spool shaft and a flange disposed opposite to said sealing member axially of said spool shaft.

6. A fishing reel according to claim 5, wherein said sealing member is annular, includes a base portion which is held at its outer peripheral side to said through bore of said cover, and is provided at its inner peripheral side with a sealing surface which faces axially relative to said spool shaft, said spool shaft having a shaft portion disposed opposite to said inner peripheral side of said sealing member and a flange disposed opposite to said sealing surface, so that, when said drag mechanism is in an operating mode, said sealing surface comes into press-contact with said flange.

* * * * *